United States Patent [19]

Notta et al.

[11] Patent Number: 5,322,346
[45] Date of Patent: * Jun. 21, 1994

[54] ECCENTRIC GEAR BACKLASH TAKE-UP MECHANISM FOR SEAT LATCHES

[75] Inventors: Adolf Notta, Toronto; Gulam Premji, Mississauga, both of Canada

[73] Assignee: Bertrand Faure Ltd., Mississauga, Canada

[*] Notice: The portion of the term of this patent subsequent to Apr. 27, 2010 has been disclaimed.

[21] Appl. No.: 5,815

[22] Filed: Jan. 19, 1993

Related U.S. Application Data

[62] Division of Ser. No. 650,827, Feb. 5, 1991, Pat. No. 5,205,609.

[51] Int. Cl.$^5$ .............................. B60N 2/02
[52] U.S. Cl. ........................... 297/367; 297/362; 297/370
[58] Field of Search ............... 297/367, 362, 379, 368, 297/366; 74/409, 440, 441, 530, 532, 512; 475/162

[56] References Cited

U.S. PATENT DOCUMENTS

| | | | |
|---|---|---|---|
| 3,432,881 | 3/1969 | Patsch et al. | 297/362 X |
| 3,479,088 | 11/1969 | Bonnaud | 297/366 X |
| 4,063,776 | 12/1977 | Wahlmann et al. | 297/362 X |
| 4,133,578 | 1/1979 | Fancy | 297/370 |
| 4,188,064 | 2/1980 | Cheshire | 297/367 |
| 4,437,703 | 3/1984 | Noshikori et al. | 297/362 X |
| 4,564,236 | 1/1986 | Kluting et al. | 297/369 X |
| 4,708,392 | 11/1987 | Ulerner | 297/362 |
| 4,732,425 | 3/1988 | Terada et al. | 297/362 |
| 4,828,322 | 5/1989 | Walk et al. | 297/362 |
| 4,836,608 | 6/1989 | Sugiyama | 297/367 |
| 4,875,735 | 10/1989 | Moyer et al. | 297/367 |
| 4,946,223 | 8/1990 | Croft et al. | 297/367 |

FOREIGN PATENT DOCUMENTS

| | | | |
|---|---|---|---|
| 2605522 | 8/1977 | Fed. Rep. of Germany | 297/367 |
| 2941405 | 4/1981 | Fed. Rep. of Germany | 297/302 |

*Primary Examiner*—Laurie K. Cranmer
*Attorney, Agent, or Firm*—Patrick J. Hofbauer

[57] ABSTRACT

A vehicular seat back recliner hinge comprises first and second hinged members that are mutually rotatably arranged about a common pivot. The first member has a gear rack arranged thereon which is adapted to be engaged by a pinion spur gear. The pinion spur gear is fixed on an adjacent ratchet wheel spur gear in mutually dependent rotatable relation about a common concentric shaft secured on a second hinged member. A selected one of the above-mentioned shaft and pivot are eccentrically mounted on a rotatable bushing arranged on a corresponding one of the members. The bushing is operable to selectively position the pinion gear and the rack in first mutually proximal and second mutually spaced positions. A locking pawl arranged on a second of the members is adapted to lockingly engaged with and unlockingly disengage from the ratchet wheel spur gear, and the locking pawl is operably positionable in selected first locking and second unlocking positions corresponding to concurrent first mutually proximal and second mutually spaced positions of the rack and pinion mentioned above. In this way, the backlash between the rack and pinion is reduced when the locking pawl, the ratchet wheel spur gear, the pinion spur gear, and the rack are serially engaged in mutually secured relation to resist relative rotation between the two hinged members, about their common pivot. In addition, this arrangement permits backlash to be increased between the pinion spur gear and the rack when the locking pawl is serially disengaged from the ratchet wheel spur gear, in order to ease the relative rotation of the two hinged members about their common pivot.

12 Claims, 5 Drawing Sheets

ECCENTRIC GEAR BACKLASH TAKE-UP MECHANISM FOR SEAT LATCHES

This application is a division of application Ser. No. 07/650,827, filed Feb. 5, 1991, now Pat. No. 5,205,609, which application is still pending and which is hereby incorporated by reference.

FIELD OF THE INVENTION

The present invention relates to vehicular seat back hinges, and especially to a hinge having an adjustable backlash feature for taking up backlash between an automotive seat back hinge rack and pinion.

BACKGROUND OF THE INVENTION

In vehicular seats, and especially in automotive seat manufacturing, hinged recliner mechanisms are generally well known. Typically, such recliners provide some form of manual locking and unlocking between a side plate pawl with a seat back rack to facilitate making selective incremental adjustments to the inclination of the backrest, relative to the seat cushion.

Typically, incremental rates of adjustment are either 2 degrees or three-quarters of a degree.

Due to the inherent practical limitations of typical mass production techniques, the three-quarter degree incremental adjustment usually employs a spur gear assembly intermediate between the locking pawl and the back support arm rack. The spur gear assembly comprises pinion and ratchet wheel spur gears that are fixed to one another, and are mutually rotatable about a common concentric shaft. The ratio of their respective diameters and teeth sizes is relied upon to achieve the fine incremental adjustment rate.

Although such a spur gear assembly is necessary in order to achieve this fine adjustment rate, their presence contributes significantly to a problem known in the art as "chuck".

The problem of chuck arises inherently in any mechanical seat back device. It is the result of the clearances that are necessarily a part of any device containing parts adapted to undergo relative movement. "Clearance" is the difference in size between mating parts prior to their assembly. Typically the clearance on cylindrical parts may be expressed as radial clearance or diametrical clearance. Positive clearance implies that the inside dimension of the female part is larger than the corresponding outside dimension of the male part. In typical mechanical applications a running fit requires about 0.001 inches of positive radial clearance for a one inch diameter shaft. A clearance of 0.003 inches on a one inch shaft is considered to be a loose fit. In mass production techniques typical of those used in automotive seat back hinge manufacture, positive clearances of 0.008 inches are not at all uncommon.

The amount of clearance typically found in seat back hinges of the type above-described, introduce an element of play that is referred to as "chuck". Note that "chuck" is not the "play" which is introduced through the flexure of any mechanical components. Rather, the term is expressly used and understood in the automobile seat back art to mean the component of play which results from mechanical lost motion due to clearance between interconnected parts, when leverage forces are applied across the seat back hinge.

"Chuck" is a highly undesirable characteristic in automobile seat back hinges, for both safety and aesthetic reasons. In fact, any increase in chuck, from the marketing point of view, is in diametric opposition with the very purpose of providing the much larger variation in possible selectable seat positioning that is achieved with the above-mentioned finer incremental adjustment rates.

The increase in chuck that is occasioned when the spur gear assembly is included in seat back recliner hinges arises partly due to the clearances between the mating teeth of the pawl/ratchet wheel and the pinion/rack, and partly due to the clearances between the spur gear assembly shaft and the holes in the side plate through which the shaft usually extends.

The clearances between the mating gear teeth is known as backlash. Backlash is a necessary characteristic of all mating gear teeth, and is needed to give the gears enough freedom to mesh and release during the relative motion between any two contacting gear faces.

In the past, attempts have been made to minimize the amount of backlash that contributes to chuck in seat back hinges, by mounting the spur gear assembly shaft between two spur gear subassembly side plates. During the manufacture of the recliner hinge, this spur gear subassembly is jammed into forced engagement with the rack on the seat back support arm, in an attempt to minimize the backlash clearance between the respective contacting gear faces. The subassembly side plates are then welded into place on the adjacent hinge side plates to secure the ear faces with a minimum of backlash clearance.

While this reduces the amount of backlash, and therefore has some effect on reducing chuck, it also reduces the operating clearance between the gear faces during seat back adjustment operations. In fact, this solution so increases the amount of friction and binding between the gear faces, as to routinely require that a much larger power spring be used in the recliner. Noisy, rough operation is also a by-product of this approach to the problem, and this too is inconsistent with the marketing of the higher quality, (i.e. more adjustable) seat back recliner features associated with upscale automobiles.

Accordingly, there remains a need in the art for improved vehicular seat back recliners.

SUMMARY OF THE INVENTION

Broadly speaking, a vehicular seat back recliner hinge is provided which includes a releasably lockable hinge mechanism for selectively positioning a pair of mutually opposed, interlockably cooperative gear faces which are secured on respective ones of first and second hinge members. These hinge members are mutually relatively rotatable about a common pivot. The mechanism in question comprises one such gear face supported on a first hinge member in eccentrically offset relation from a rotational center on a selectively rotatably bushing, together with another such gear face operably positioned to cooperatively engage in releasably locked relation with the first above-mentioned, one such gear face, when the bushing is selectively rotated to effect an eccentrically motivated positional translation of the one such gear face into an inferior conjunction with another such gear face.

In its broadest aspects, the present invention contemplates embodiments in which the two gear faces are moved into and out of contacting, cooperative engagement, through the selective positional translation effected by way of the eccentric bushing. Such embodiments would include vehicular seat back hinges which may or may not also include pinion and ratchet spur wheel subassemblies. As has already been mentioned hereinbefore, however, there is a very real and substantial need for vehicular seat back hinges in which pinion spur gear backlash is adjustable to facilitate freer rotation of the seat back during rotational adjustment of the hinge.

In accordance with a particularly preferred and advantageous aspect of the present invention, therefore, there is provided a vehicular seat back recliner hinge adapted for the selective incremental adjustment of the inclination of a back rest relative to a seat cushion. The present hinge comprises first and second hinge members which are mutually rotatably arranged about a common pivot. The first such member has a gear rack arranged thereon which is adapted to be engaged by a pinion spur gear. The pinion spur gear is fixed to an adjacent ratchet wheel spur gear in mutually dependant rotatable relation therewith about a common concentric shaft that is secured on the second of the above-mentioned members.

A selected one of the shaft and the pivot are eccentrically mounted on a rotatable bushing which is arranged on a corresponding one of the members. The bushing is operable to selectively position the pinion spur gear and the rack in one of first mutually proximal and second mutually spaced positions. Note that in the second mutually spaced positions, the two gear faces are not necessarily arranged in a non-contacting relation. It is sufficient that the contacting relation between the two faces in the second position result in a reduction in backlash.

A locking pawl is arranged on the second of the members, and is adapted to lockingly engage with and unlockingly disengage from the ratchet wheel spur gear. The locking pawl is operably positionable in selected first locking and second unlocking positions corresponding to concurrent first mutually proximal and second mutually spaced positions of the above-mentioned rack and pinion. In accordance with the above-described device, it is possible to selectively reduce backlash between the pinion and the rack when the locking pawl, the ratchet wheel spur gear and the pinion spur gear and the rack are serially engaged in mutually secured relation, so as to prevent the relative rotation between the two members about their common pivot. Moreover, it is possible to increase the backlash clearance between the pinion spur gear and the rack when the locking pawl is serially disengaged from the ratchet wheel spur gear, and this thereby facilitates relative ease of rotation of the two members about their common pivot.

Typically, the first member hereinbefore described will be a seat back support arm, while a second member will be a seat cushion assembly side plate. Moreover, it is preferred that the shaft be eccentrically mounted on the rotatable bushing, and that the bushing be arranged on the side plate.

Preferably, the locking pawl and the rotatable bushing are co-operably linked to concurrently, and respectively:
engage the ratchet wheel spur gear, and eccentrically rotate the pinion spur gear into proximal relation with the rack wherein all of the above-mentioned components are arranged in their respective first positions; and,
disengage the ratchet wheel spur gear and eccentrically rotate the pinion gear into spaced relation from the rack, wherein all of the above-mentioned components are located in their respective second positions.

Typically, a cam assembly is pivotally arranged on the side plate with a rotational spring bias adapted to normally rotate a cam surface into first contacting relation with a cam follower surface on the locking pawl. This biases the locking pawl into the first locking position. The cam assembly is manually operable however, to be rotatable contrary to the rotational spring bias, and into a second contacting relation with another cam follower surface of the locking pawl, which is adapted to move the locking pawl into the second unlocking position. The rotatable bushing is also normally spring biased in order to position the pinion spur gear and the rack into the first proximal position. An extension of the cam assembly has another cam surface which acts concurrently (i.e. during the manual operation of the cam assembly as a whole), on a cam follower surface of the rotatable bushing. In this way the bushing is rotated to thereby eccentrically position the pinion spur gear and the rack in their second relatively spaced position. Preferably, the spring bias on the cam and the rotatable bushing are provided by a common spring acting in tension between lever arms on respective ones of the cam assembly and the rotatable bushing.

As will be apparent to the person skilled in the art in light of the foregoing summary, devices according to the present invention can accommodate repeated cycling and concomitant wear without having any resulting increase in backlash clearances manifest as a chuck problem, since the eccentric spring bias on the relative positioning of the rack and pinion will continually position the two to minimize backlash clearance therebetween, not withstanding any normal amounts of wear. Moreover, this bias is such that the normal vibrations of the seat back during operation of the automobile will in fact result in even more backlash clearance being taken up. In effect, the present device will, up to a point, manifest less and less chuck during use.

DETAILED DESCRIPTION OF THE DRAWINGS

Figure 1A:
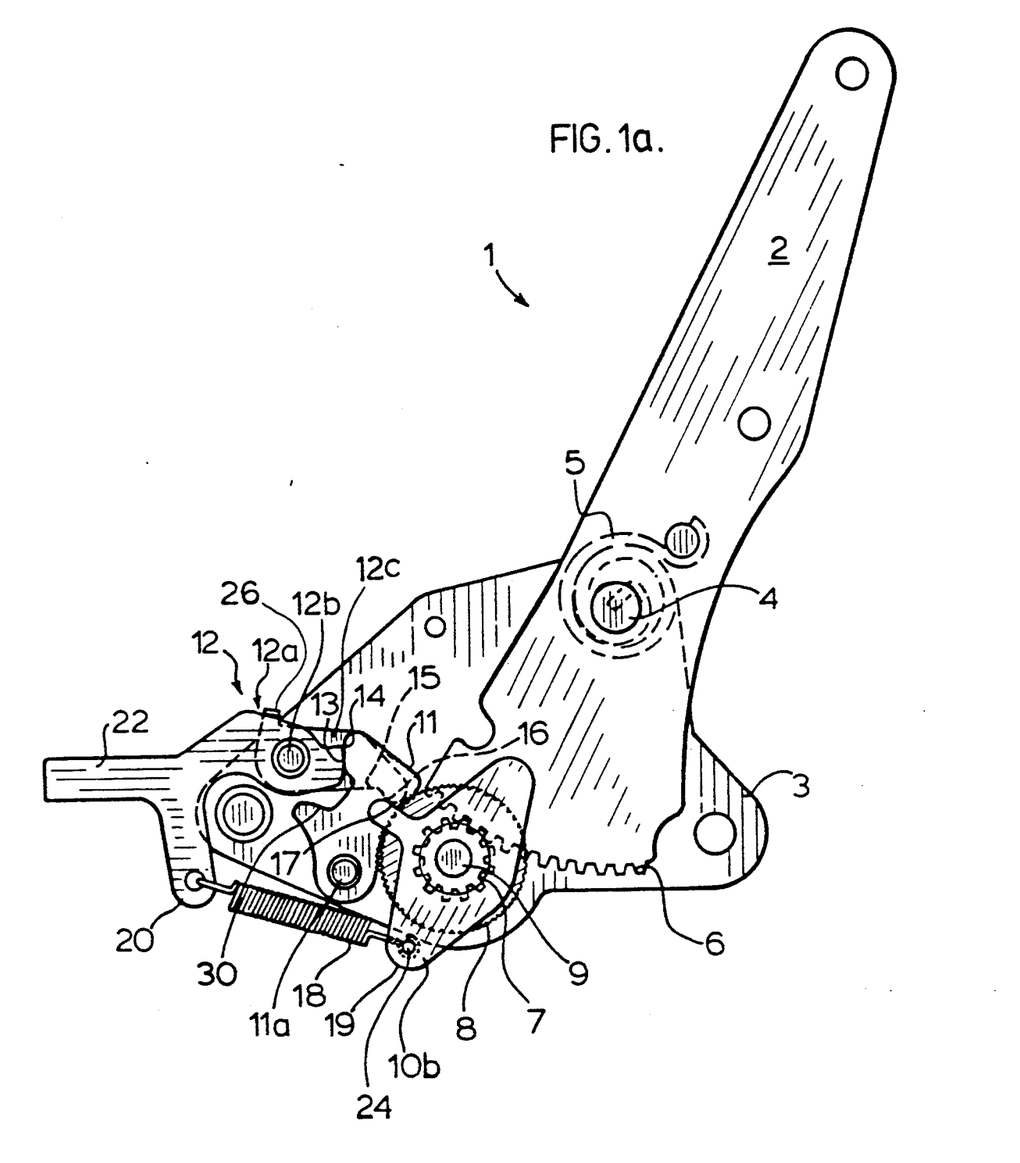
FIG. 1a of the drawings illustrates a preferred embodiment of the present invention, as showing an elevated side view of an automotive seat back recliner hinge, with a proximal side plate removed to reveal the operating components.
Figure 1B:
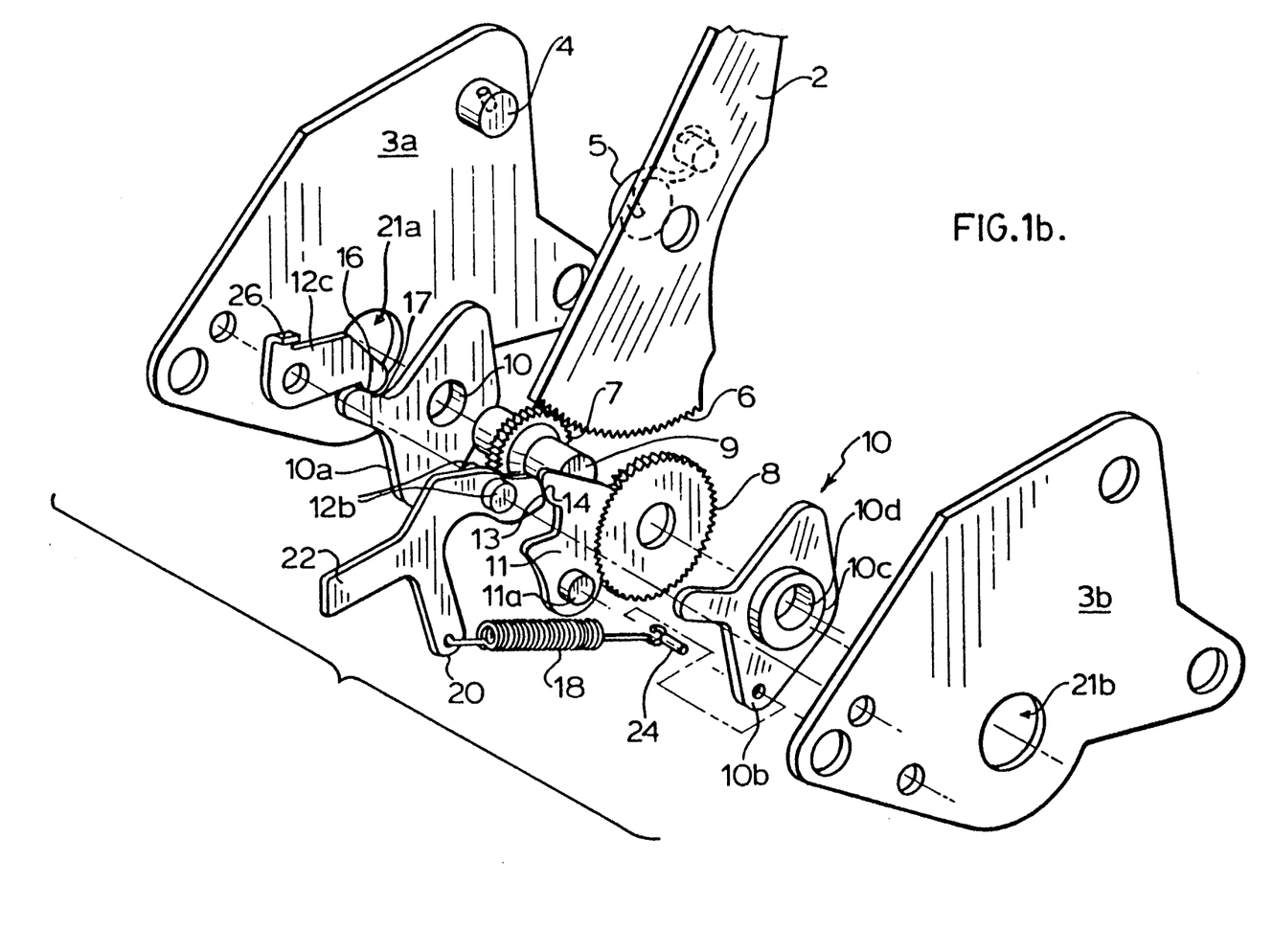
FIG. 1b of the drawings is an exploded view of the seat back recliner hinge of FIG. 1.

Referring now to FIGS. 1a and 1b of the drawings, there is illustrated an automotive seat back recliner hinge generally designated by the reference numeral 1.

Hinge includes a first hinged member, seat back support arm 2, and a second hinge member, cushion assembly side plate 3a. These are respectively secured as is well-known in the art to seat back and seat cushion members of a vehicle seat assembly (not shown). Support arm 2 and side plate 3 are mutually relatively rotatable about common pivot 4. A power spring 5 is arranged to assist the return of the automotive seat back towards the upright position, from either a fully or intermediately reclined position.

Figure 4:
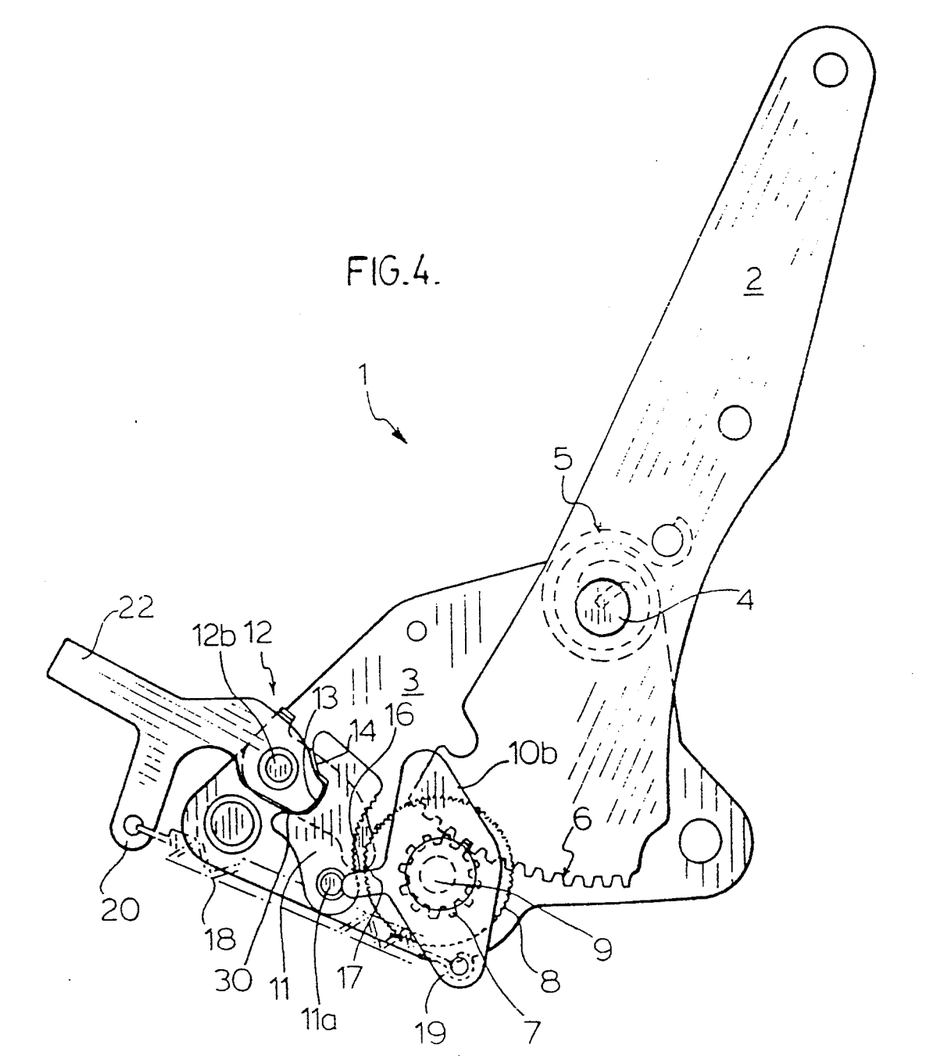
FIG. 4 depicts the embodiment illustrated in FIG. 1, positioned with the operable elements arranged in their respective "second" positions.

Seat back support arm 2 includes a gear rack 6 which is adapted to be engaged with a pinion spur gear 7. Pinion spur gear 7 is rigidly fixed by any conventional means, such as press-fitting or welding, to shaft 9, as is adjacent ratchet wheel spur gear 8. Thus, the two spur gears 7 and 8 are mutually dependently rotatable with concentric shaft 9. Shaft 9, in turn, is eccentrically mounted for rotation on a rotatable bushing 10. The eccentric bushing 10 is, as shown, preferably a two part bushing made up of portions 10a and 10b arranged on mutually opposed sides of the two gears 7 and 8. The two parts are preferably mirror images of one another, and each have an integral boss defining collar portions 10c. Each of 10a and 10b are operationally connected to each other to rotate in unison about collar portions 10c, by means of, for example, connecting rivet 24 (see FIG. 3a). Portions 10a and 10b are operationally interconnected to each other to rotate in unison with one another in the manner just described independently of shaft 9, but about the transitional axis defined by the shaft 9. It will be appreciated that unitary rotation of the bushing portions 10a, 10b within the apertures 21a and 21b in the manner herein described will, due to the eccentric placement of the central apertures 10d, 10d, in the collar portions 10c, 10c, cause the axis of shaft 9 to cyclically translate. The collar portions 10c (on each of 10a and 10b) are respectively mounted for rotation in apertures 21a and 21b of side plate 3a and proximal side plate 3b. Accordingly, bushing 10 is operable to selectively position the pinion spur gear 7 (which is rigidly attached to shaft 9) and the rack 6 in a first mutually proximal position, (as shown in FIGS. 1a and 1b), and a second mutually spaced position (as shown in FIG. 4).

A locking pawl 11 is pivotally arranged on side plate 3b, to rotate about pivot pin 11a and adapted to lockingly engage with and unlockingly disengage from the ratchet wheel spur gear 8. The locking pawl 11 is operably positionable in selected first locking, (as illustrated in FIG. 1), and second unlocking positions, (as illustrated in FIG. 4) corresponding to the concurrent first mutually proximal and second mutually spaced positions of pinion gear 7 and gear rack 6.

In operation, the amount of backlash between pinion spur gear 7 and gear rack 6 is reduced when the locking pawl 11, the ratchet wheel spur gear 8, the pinion spur gear 7 and the rack 6 are serially engaged in mutually secured relation to prevent relative rotation between the support arm 2 and the side plate 3a about their common pivot 4. This mechanical arrangement also allows backlash to be increased between the pinion spur gear 7 and the gear rack 6, once the locking pawl 11 is serially disengaged from the ratchet wheel spur gear 8. In this latter configuration, the relative rotation of support arm 2 and side plate 3a about their common pivot 4, is facilitated.

As illustrated, the locking pawl 11 and the rotatable bushing 10 are co-operably linked in order to concurrently, and respectively:

engage the ratchet wheel spur gear 8, and eccentrically rotate the pinion spur gear 7 into proximal relation with gear rack 6, with the respective components in their corresponding first positions; and, disengage the ratchet wheel spur gear 8, and eccentrically rotate the pinion gear 7 into spaced relation from gear rack 6 when the respective components are in their corresponding second positions.

As already mentioned hereinbefore, FIG. 1 depicts these components in their respective first positions.

Cam assembly 12 is pivotally arranged on side plates 3a and 3b to rotate about co-axial pivot pins 12b, 12b, with a spring bias that is adapted to normally rotate a cam surface 13 into first connecting relation with a cam follower surface 14 of the locking pawl 11. This in turn biases the locking pawl 11 into the above-mentioned first locking position as shown in FIG. 1. At the same time, cam assembly 12 is manually operable by way of manual lever 22, to be rotatable contrary to the above-mentioned bias, and into a second contacting relation with another cam follower surface 30 of locking pawl 11, which is adapted to move the locking pawl 11 into the—second unlocking position, as shown in FIG. 4.

Rotatable bushing 10 is itself normally spring biased to position pinion spur gear, 7 and gear rack 6 into their first proximal position. An extension lever arm 12c of cam assembly 12, also pivotally mounted on pivot pin 12b and having a cam surface 16, acts concurrently with the operation of manual lever 22 on cam assembly 12, (through the agency of bent tab 26) on a cam follower surface 17 on segment 10a of rotatable bushing 10, to rotate bushing 10 and thereby eccentrically position pinion spur gear 7 and gear rack 6 into their second spaced positions.

As illustrated in FIG. 1, the spring biasing forces on cam assembly 12 and rotatable bushing 10, are provided by way of a common spring 18 acting in tension between lever arm 20 of the cam assembly 12 and connecting rivet 24 extending between segments 10a and 10b of bushing 10.

Figures 2, 3A, 3B:
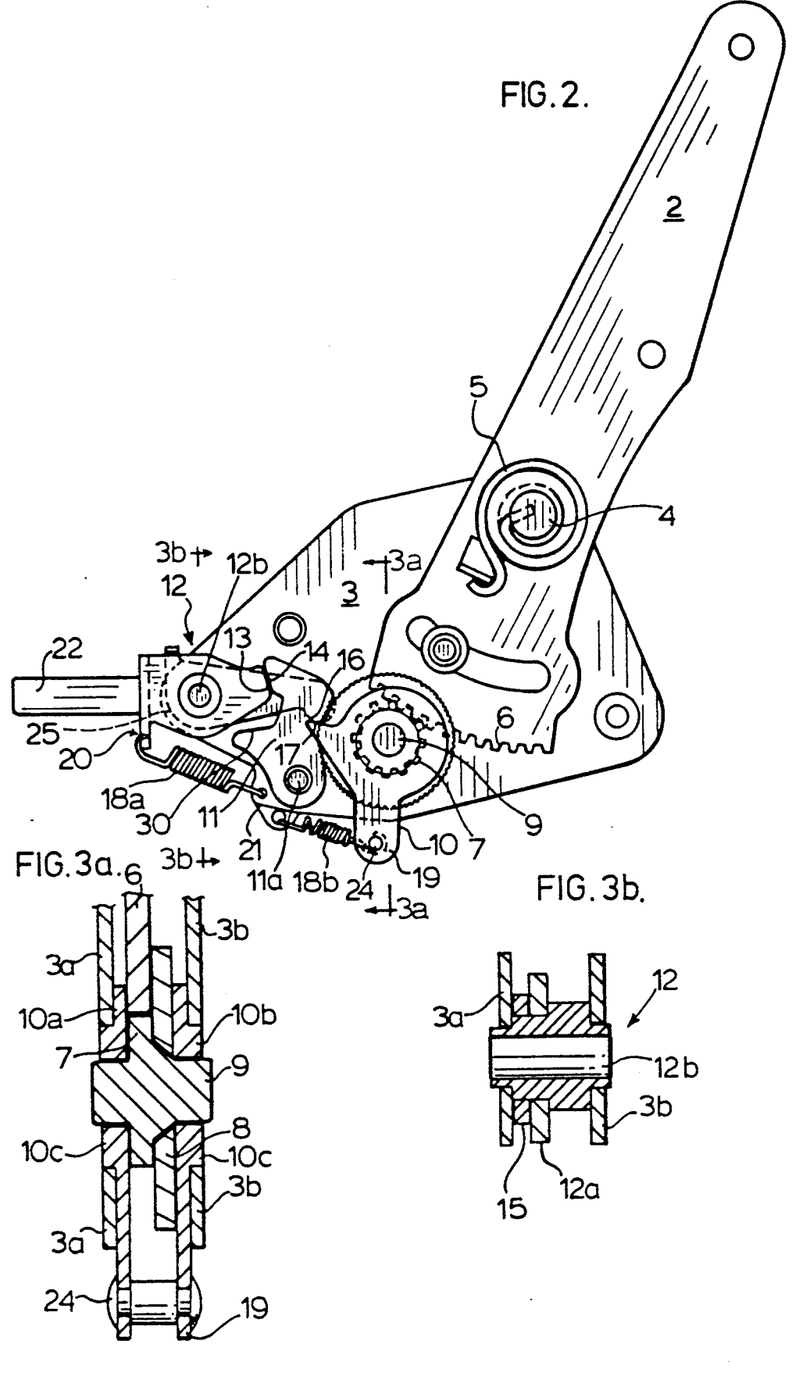
FIG. 2 of the drawings depicts an alternate embodiment in accordance with the present invention, here again as an automotive seat back recliner hinge with the proximal side plate removed for greater clarity.
FIG. 3a of the drawings is a cross-section through line 3a—3a of FIG. 2 would appear with both side plates duly positioned.
FIG. 3b is a cross-sectional view through line 3b—3b of FIG. 2, and is shown as the cross-section would appear with both side plates duly positioned on either side of the hinge.

Referring now to FIG. 2 of the drawings, there is shown an alternate embodiment to the present invention. Reference numerals on FIG. 2 correspond to the same functional elements referenced in FIG. 1. Note, however, that the spring biasing forces on cam assembly 12 and rotatable bushing 10 are provided by way of springs 18a and 18b respectively. Instead of being provided by way of common spring extending in tension between lever arms 20 and 19, the tension is provided between those respective lever arms and corresponding points of attachment on a portion 21 of side plate 3a.

Turning now to FIG. 3a of the drawings, there is illustrated a cross-section taken along line A—A of FIG. 2. This cross-section gives a clear representation of how the eccentric bushing 10 is mounted between side plates 3a and 3b, and supports the pinion spur gear 7 and ratchet wheel spur gear 8 relative to their common shaft 9.

Referring now to FIG. 3b of the drawings, there is illustrated a cross-section through line B—B of FIG. 2, more clearly illustrate portions of cam subassembly 12. Note in particular that cam extension 15 is arranged on a common shaft adjacent primary cam 12a, between respective side plates 3a and 3b.

Figures 5, 6:
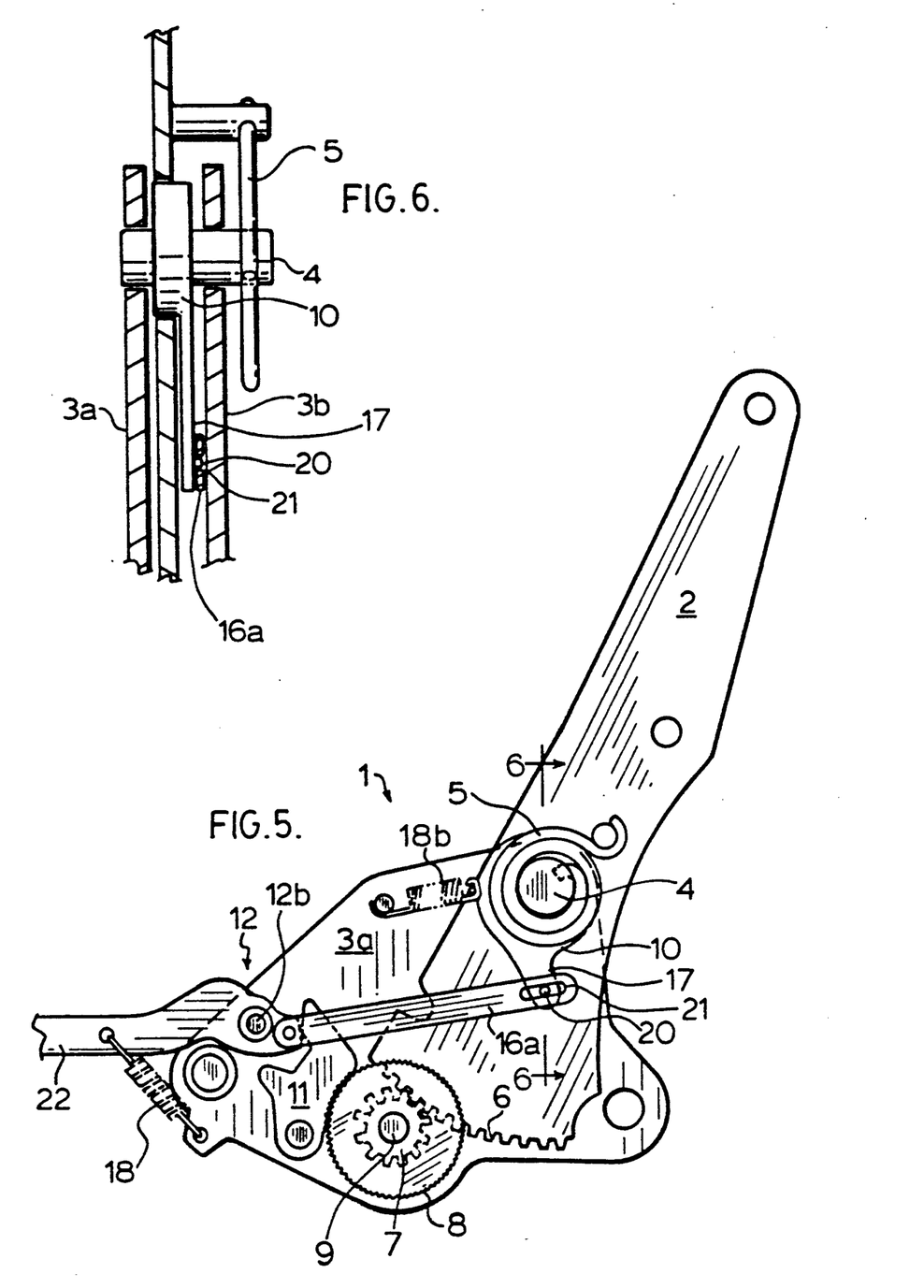
FIG. 5 of the drawings depicts an alternate embodiment wherein the main pivot is eccentrically mounted on the rotatable bushing.
FIG. 6 of the drawings is a cross-sectional view along line 6—6 of FIG. 5.

Referring now to FIGS. 5 and 6 of the drawings, there is illustrated a second embodiment of the invention wherein a vehicular seat back hinge 1 in which the common pivot 4 is rotatably mounted in eccentric bushing 19 so as to facilitate backlash adjustment between rack 6 and pinion spur gear 7. It will be appreciated by those skilled in the art that the eccentric bushing mechanism 19 is substantially similar to that illustrated in FIG. 3a of the drawings and like reference numerals have been used to designate similar structures in the two embodiments illustrated. Extension 17 of bushing 10 is cooperatively joined to cam assembly 12 by extension 16a. Extension 16a is pivotally connected through, the balance of cam assembly 12 through a pin 20 engaging a slot 21 positioned adjacent one end of the extension 16a. Extension 16a is connected to portion 17 of bushing 10 by way of a slot and pin arrangement. This supports a certain degree of lost motion between the axial movement of extension 16a on rotation of the cam assembly 12, prior to rotating eccentric bushing 10, during the release of the locking pawl 11 from ratchet wheel spur gear 8. Return spring 18b biases the bushing 10 to the first mutually proximal position. Upward movement of the free end of manual lever 22 causes the locking pawl 11 to disengage from locking engagement with the ratchet wheel spur gear 8, and thereby allow rotation of the pinion spur gear 7 in a manner generally similar to the mechanism illustrated in FIGS. 1–4. Moreover, extension 16a engages the pin 20 by means of the terminal end of the slot 21 upon such upward travel of the manual lever 22, which in turn causes the eccentric bushing 10 to rotate to the second mutually spaced position, so as to increase backlash between the pinion spur gear 7 and the rack 6, so as to ease relative rotation of said first 2 and second 3 hinge members about the pivot 4.

We claim:

1. A vehicular seat back-recliner hinge for the selective incremental adjustment of the inclination of a backrest relative to a seat cushion, said hinge comprising:
   first and second hinged members, mutually rotatably arranged about a common pivot, with said first member having a gear rack arranged thereon;
   a pinion spur gear adapted to engage said rack, said pinion spur gear being fixed to an adjacent ratchet wheel spur gear in mutually dependently rotatable relation therewith about a common concentric shaft mounted on said second hinged member;
   said shaft being eccentrically mounted on a rotatable bushing mounted for rotation on said second hinged member, said bushing being operable during rotation thereof to selectively position said pinion spur gear and said rack in first mutually proximal and second mutually spaced positions;
   a locking pawl arranged on said second hinged member and adapted to selectively lockingly engage with and unlockingly disengage from said ratchet wheel spur gear, said locking pawl being operably positionable in selected first locking and second unlocking positions corresponding to concurrent first mutually proximal and second mutually spaced positions, respectively;
   means for rotating said bushing in one rotational direction to thereby reduce backlash between said pinion spur gear and said rack when said locking pawl, said ratchet wheel spur gear, said pinion spur gear and said rack are serially engaged in mutually secured relation to prevent relative rotation between said hinged members about said pivot and for rotating said bushing in a second opposite rotational direction, to thereby increase backlash between said pinion spur gear and said rack when said locking pawl is serially disengaged from said ratchet wheel spur gear to thereby ease the relative rotation of said hinged members about said common pivot.

2. The hinge according to claim 1 wherein the first member is a seat back support arm, and the second member is a seat cushion assembly side plate.

3. The hinge according to claim 2 wherein said locking pawl and said rotatable bushing are co-operably linked by a cam assembly to concurrently, respectively:
   engage said ratchet wheel spur gear, and
   eccentrically rotate said pinion spur gear into proximal relation with said rack, in said first positions; and,
   disengage said ratchet wheel spur gear, and eccentrically rotate said pinion gear into spaced relation with said rack, in said second positions.

4. The hinge according to claim 3 wherein the cam assembly is pivotally arranged on the seat cushion assembly side plate with a spring bias adapted to normally rotate a cam surface thereof into first contacting relation with a cam follower surface on the locking pawl, and to thereby bias the locking pawl into said first locking position, and wherein said cam assembly is manually operable to be rotatable contrary to said bias into a second contacting relation with another cam follower surface of said locking pawl adapted to move said locking pawl into said second unlocking position.

5. The hinge according to claim 4 wherein said rotatable bushing is normally spring biased to position said pinion spur gear and said rack in said first mutually spaced proximal position, and wherein an extension of said cam assembly having another cam surface acts concurrently upon said manual operation of the cam assembly, on a cam follower surface of said rotatable bushing, to rotate said bushing and thereby eccentrically position said pinion spur gear and said rack in said second mutually spaced position.

6. The hinge according to claim 5 wherein the spring bias is provided by a common spring acting in tension between lever arms on respective ones of said cam assembly and said rotatable bushing.

7. In an automotive seat assembly having an adjustable seat back, the improvement comprising a vehicular seat back recliner hinge for selective incremental adjustment of the inclination of the seat back relative to a seat cushion, said hinge comprising:
   first and second hinged members, mutually rotatably arranged about a common pivot, with said first member having a gear rack arranged thereon;
   a pinion spur gear adapted to engage said rack, said pinion spur gear being fixed to an adjacent ratchet wheel spur gear in mutually dependently rotatable relation therewith about a common concentric shaft secured on said hinged member;
   said shaft being eccentrically mounted on a rotatable bushing mounted for rotation on said second hinged member, said bushing being operable during rotation thereof to selectively position said pinion spur gear and said rack in first mutually proximal and second mutually spaced positions;

a locking pawl arranged on said second hinged member, and adapted to selectively lockingly engage with and unlockingly disengage from said ratchet wheel spur gear said locking pawl being operably positionable in selected first locking and second unlocking positions corresponding to concurrent first mutually proximal and second mutually spaced positions, respectively;

means for rotating said bushing in one rotational direction to thereby reduce backlash between said pinion spur gear and said rack when said locking pawl, said ratchet wheel spur gear, said pinion spur gear and said rack are serially engaged in mutually secured relation to prevent relative rotation between said hinged members about said common pivot, and for rotating said bushing in a second opposition rotational direction, to thereby increase backlash between said pinion spur gear and said rack when said locking pawl is serially disengaged from said ratchet wheel spur gear, and thereby ease the relative rotation of said hinged members about said common pivot.

8. The hinge accordingly to claim 7 wherein the first member is a seat back support arm, and the second member is a seat cushion assembly side plate.

9. The hinge according to claim 7 wherein said locking pawl and said rotatable bushing are co-operably linked by a cam assembly to concurrently, respectively:

engage said ratchet wheel spur gear, and eccentrically rotate said pinion spur gear into proximal relation with said rack, in said first positions; and, disengage said ratchet wheel spur gear, and eccentrically rotate said pinion gear into spaced relation with said rack, in said second position.

10. The hinge according to claim 9 wherein a cam assembly is pivotally arranged on the seat cushion assembly side plate with a spring bias adapted to normally rotate a cam surface thereof into first contacting relation with a cam follower surface on the locking pawl, and to thereby bias the locking pawl into said first locking position, and wherein said cam assembly is manually operable to be rotatable contrary to said bias into a second contacting relation with another cam follower surface of said locking pawl adapted to move said locking pawl into said second unlocking position.

11. The hinge according to claim 10 wherein said rotatable bushing is normally spring biased to position said pinion gear and said rack in said first mutually spaced proximal position, and wherein an extension of said cam assembly having another cam surface acts concurrently upon said manual operation of the cam assembly, on a cam follower surface of said rotatable bushing, to rotate said bushing and thereby eccentrically position said pinion spur gear and said rack in said second mutually spaced position.

12. The hinge according to claim 11 wherein the spring bias is provided by a common spring acting in tension between lever arms on respective ones of said cam assembly and said rotatable bushing.

* * * * *